Nov. 24, 1970 H. STOPPER 3,543,198

CONDUCTOR ARRANGEMENT FOR GIGAHERTZ FREQUENCY RANGE CIRCUITS

Filed July 19, 1968

2 Sheets-Sheet 1

Inventor:
Herbert Stopper
BY Spencer & Kaye
ATTORNEYS.

Inventor:
Herbert Stopper
BY Spencer & Kaye
ATTORNEYS.

United States Patent Office 3,543,198
Patented Nov. 24, 1970

3,543,198

CONDUCTOR ARRANGEMENT FOR GIGAHERTZ FREQUENCY RANGE CIRCUITS

Herbert Stopper, Litzelstetten, Germany, assignor to Telefunken Patentverwertungsgesellschaft m.b.H., Ulm (Danube), Germany Filed July 19, 1968, Ser. No. 746,066
Claims priority, application Germany, July 21, 1967, 1,591,702
Int. Cl. H01p 3/00, 3/08
U.S. Cl. 333—84 4 Claims

ABSTRACT OF THE DISCLOSURE

A conductor arrangement for printed circuits operating in the gigahertz frequency range and composed of a plurality of circuit elements mounted on a circuit board, the conductors being constituted by triple striplines each composed of three lines disposed parallel to one another, with the center line being connected to a reference potential source and the two outer lines being connected to conduct information signals and having their output ends terminated to the center conductor by identical terminal resistances.

BACKGROUND OF THE INVENTION

The present invention relates to a circuit arrangement for the gigahertz frequency range, and particularly to conductors disposed on a circuit plate and composed of printed lines.

In the past, the speed of rapid digital switching networks such as those of digital computers, has been considerably increased through the use of integrated circuits. Recently, logic circuits have been developed which possess signal delay times and rise times of the order of $10^{-9}$ seconds. Such circuits greatly increase the maximum possible operating speeds of the digital switching networks to such an extent that the signal delay times of the circuit conductor lines become the greatest factors determining the possible network operating speed.

The interaction of switching circuits with each other, which had to be taken into consideration in earlier digital switching networks operating in and below the megahertz frequency range, is now replaced by the interaction between a switching circuit and its connecting lines.

The high component density which can be achieved in integrated circuits should not, if at all possible, be reduced by any limitations presented by the connecting lines. Since a definite characteristic impedance must be given to these lines, such circuits can no longer be constructed, as was previously done, by providing a single line for conducting a signal from a source to a load while completing the current flow circuit by a return line presenting a more or less undefined flow path. Rather, the signal current return line should be geometrically defined with respect to the signal forward flow line. This could be accomplished through the use of single-phase lines in the form of striplines, for example. The coupling between such lines, however, is often so close that the entire conductor system on a printed circuit board must be considered to be a multiple-wire line. Since, however, the reciprocal coupling between different lines must not exceed a predetermined value, the conductor lines must be maintained at some minimum distance from each other which again has an adverse influence on the component density.

SUMMARY OF THE INVENTION

It is a primary object of the present invention to overcome these drawbacks and difficulties.

Another object of the invention is to provide a conductor arrangement having improved electrical properties.

Still another object of the invention is to reduce the total circuit board surface area required for conductors.

Still another object of the invention is to substantially reduce electrical interferences between adjacent conductors.

A still further object of the invention is to substantially simplify the connection together of circuit elements for conducting two opposite polarity signals between them.

These and other objects according to the invention are achieved by the provision of improved conductors in a printed circuit arrangement for operation in the gigahertz frequency range, which arrangement includes circuit elements mounted on a circuit board and arranged to operate with respect to a common reference potential, and printed conductors connecting the elements together. The improvement according to the invention resides in that the conductors are constructed as triple striplines each composed of three lines disposed parallel to one another, the center line being connected at its input point to a source of the reference potential and the two outer lines being connected to carry information signals, the outer lines being connected at their outputs in opposition to the center line via terminal resistances having the same resistance value.

The present invention provides for a system of conductor lines which permits the realization of trouble-free rapid switching systems and which generally offers new possibilities in the area of the gigahertz frequency range for the transmission of signals through lines on circuit boards, films, etc.

The circuit arrangement according to the present invention is preferably disposed on a circuit board and is characterized in that each conductor is constructed as a triple stripline whose center strip is connected, at least at its input point, to the reference potential. The two outer strips serve to transmit the signal to their associated load and the terminal impedances of the two outer striplines are connected in opposition to the center strip and have the same resistance, or impedance, value.

A particularly favorable dimensioning of the lines according to the present invention will enable, on the one hand, the characteristic impedances of the lines to be substantially lower than the input resistances of the circuits connected thereto, so that the lines will have substantially no load at their outputs and, on the other hand, the characteristic impedances of the lines to be high enough that maximum signal energy waves reflected at the line ends will be absorbed by the output resistances of the associated circuit.

Based on these capabilities, when circuits are used which each have two outputs in phase opposition representing in particular, a binary signal and the inverted version thereof, the present invention provides that, for the transmission of at least one of the signals from such a circuit to another circuit, the two outer strips of the respective conductor line are connected to the two outputs of the one circuit.

DESCRIPTION OF THE PREFERRED EMBODIMENTS

Figure 1:
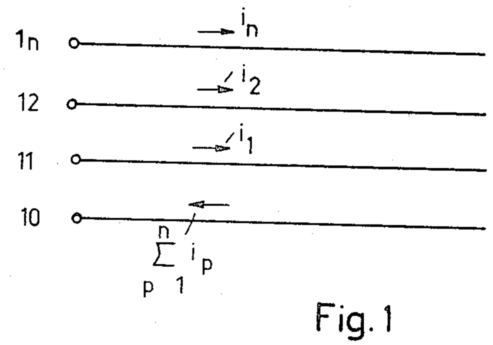
FIG. 1 is a pictorial diagram used in explaining the concepts of the present invention.

FIG. 1 shows a system of $n+1$ lines 10, 11, 12, . . ., 1*n*. The lines 11, 12, . . ., 1*n* conduct signal currents $i_1, i_2, \ldots, i_n$, in their forward directions and all of these currents flow back together through line 10 to the signal sources, not shown. Only alternating voltages and currents are considered here and where direct voltages and currents are present, only their alternating current components are considered.

In such a system of lines, the signals applied to the lines are conveyed by *n* wave trains of differing phase velocities. In the entire line system there are only *n* wave phase velocities. Furthermore, each wave of one type, i.e. of one phase velocity, creates at any contact point existing in the line or due to faulty termination of the same, reflected waves of all *n* types present in the system.

If such a system of lines were so arranged that all of the forward conducting lines 11, 12, . . ., 1*n* were identical with respect to their inherent parameters and their relationship to line 10, and so that the terminal resistances of all lines 11, 12, . . ., 1*n* were identical and were connected to line 10, a situation would be created where a total of only two phase velocities appear in the network, where each signal in one line is divided into only two wave trains of differing phase velocities, and each partial wave, when reflected at the end of a line, only produces a wave of its own type. If all lines were then terminated with the characteristic impedance appropriate for this one wave type, all waves of this type would be transmitted without reflection, while the waves of the other type would be partially reflected. Depending on the selection of the values for the terminal resistances, the one or the other wave type can be used for the actual transmission of information signals. This represents a substantial discovery made during the development of the present invention.

Figure 2:
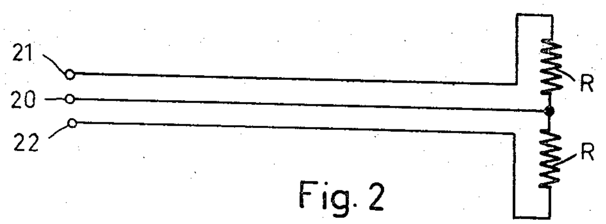
FIG. 2 is a simplified circuit diagram of an embodiment of the invention.

FIG. 2 shows a special case of the network described in connection with FIG. 1. Here two signal lines 21 and 22 are present, and a common return line 20, corresponding to line 10 in FIG. 1, is provided for completing the circuit of both signal lines. Lines 21 and 22 are assumed to be identical in their inherent parameters and in their relation to line 20. They are in addition each terminated in conjunction with line 20 by a resistor R. Here again there are only two wave types, i.e. waves of different phase velocities, present in the entire network and the signals applied to the two lines 21 and 22 are each conveyed by the two types of waves. By dimensioning each of the terminal resistances R of the lines 21 and 22 to be equal to the characteristic impedance of the line with reference ti one or the other wave type it is, again, possible to effect a signal transmission by means of one of the two wave types. It is here preferable to dimension the terminal resistances R in conformance with the characteristic impedance of that wave type which carries the main signal energy.

The line arrangement shown in FIG. 2 can be applied with particular advantage to printed circuit boards where the desired electrical line symmetry is achieved, according to the present invention, by constructing the stripline of three strip conductors disposed in one plane. Such an arrangement is shown in FIG. 3.

The circuit board is provided on its top surface with two stripline units of the type mentioned above, whereas one identical stripline unit is shown on the underside of the circuit board.

The striplines each consist of three parallely arranged strip conductors 30, 31, 32, all having the same width *a*, and hence the same cross section, and with outer strips 31 and 32 equidistant from strip 30, the strips being spaced from one another by a distance *b*. The strip conductors 31 and 32 take over the functions of the lines 21 and 22 of FIG. 2 and the strip conductor 30 performs the function of line 20. Since the strip conductors 31 and 32 are symmetrical with respect to strip conductor 30 insofar as concerns their physical geometry and their position, the requirement stated with reference to the arrangement of FIG. 2 for identical characteristic parameters of the two signal lines is met with reference to the return line. The further requirements for identical termination of both strip conductors 31 and 32 (corresponding to 21 and 22 in FIG. 2) will be met by the circuits connected thereto.

Figure 3:
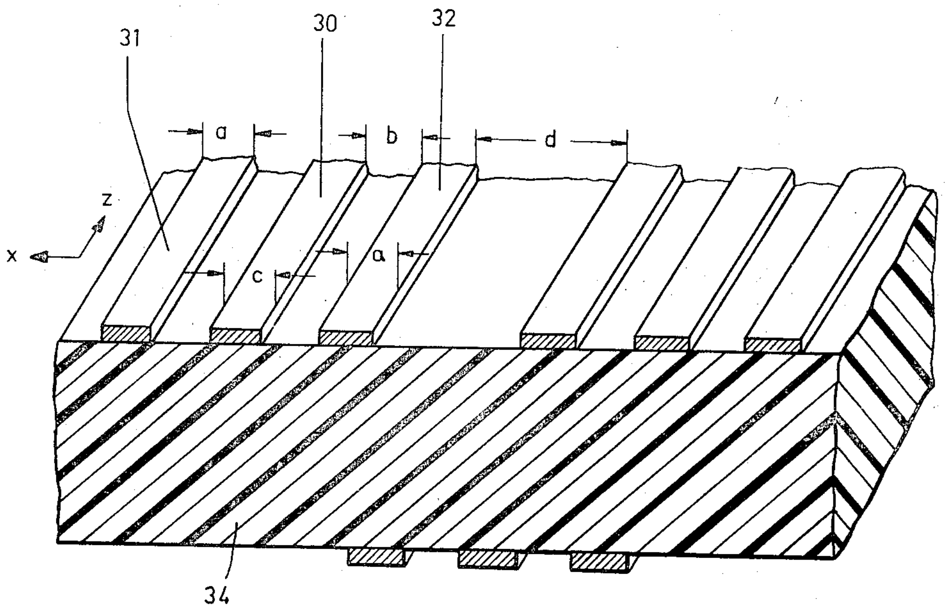
FIG. 3 is a perspective view of a support provided with an embodiment of the invention.

The advantages of a symmetrically terminated stripline according to the present invention as shown in FIG. 3, are, in addition to the advantageous electrical properties which were discussed in part and which will be further explained below, that the striplines are disposed in one plane so that the underside of the circuit board remains available for the application of further switching circuits and lines. The use of a three strip conductor system according to the invention eliminates the need for providing a conductive layer which is maintained at reference potential, e.g. ground, and extends over the entire surface of the circuit board. Since, for topological reasons, each "printed" circuit requires two wiring planes, the present invention eliminates, for circuits designed to operate in the above-mentioned frequency range, the otherwise required use of expensive multiple-layer boards.

A further advantage of strip conductors disposed in the same plane for the realization of striplines according to the present invention is that due to the unvarying spacing between the conductors of each stripline, the frequency-dependent line parameters of a longitudinal section of the line having a length $dz$ do not change. In contradistinction thereto, it is not possible, without employing special measures, to maintain uniform the thickness of large area conductive circuit sheets or circuit films across the entire surface of a circuit board and any nonuniformity would cause a conductive line, whose elements were disposed on both sides of the circuit board, to experience fluctuations in its characteristic impedance, or its characteristic impedances, depending on the location of the line segments considered.

A prominent electrical characteristic of the stripline according to the present invention resides in the very low crosstalk occurring in parallel lines. This crosstalk is here substantially less than in the single-phase lines mentioned earlier.

Two signals can be transmitted simultaneously by a symmetrically terminated two-phase line according to the present invention. In the most common transmission procedure in digital switching networks, a binary signal and, simultaneously therewith, its inverted value are to be transmitted from one circuit component to another. These two signals are, if one does not consider their uninteresting identical portions which are here unimportant, symmetrical with respect to the reference potential of the circuit so that this represents the further special case of transmission of symmetrical signals.

It has been found that the parameters of the symmetrically fed stripline according to the present invention are not noticeably influenced by interfering adjacent lines and that interfering voltages fed into the line as a result of the recriprocal coupling of the conductors are particularly low. In addition to the advantage of low crosstalk already discussed with reference to the single-phase line mentioned previously, which line can also be formed in only one plane, there is the further advantage of the constancy of the characteristic line parameters. Due to the reduced coupling between differing striplines, the electrically effective characteristic impedances are hardly changed.

In the following description the stripline of the present invention which is symmetrically terminated by one of its characteristic impedances, will be called a two-phase line.

In a circuit arrangement, e.g. a digital circuit system, each line can not be considered in isolation; it is rather necessary to take into consideration that the circuits employed in the circuit arrangement, such as logic circuits, flip-flops, inverters, etc., should be constructed to permit a symmetrical termination of the two-phase line and to permit the terminal resistances to be adjusted to the line parameters.

Figure 4:
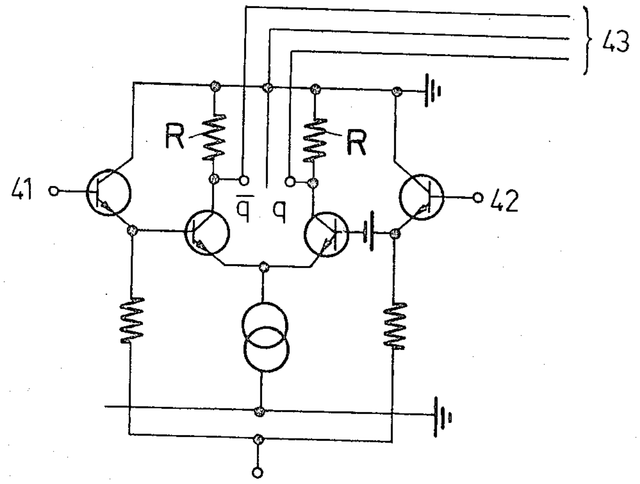
FIG. 4 is a circuit diagram showing one mode of connection of a conductor according to the invention.

FIG. 4 shows a typical example of a current integrated fast-acting logic circuit capable of operation in the nanosecond range. This circuit is so flexible in the logic functions which it can perform that complete digital switching networks can be constructed from a plurality of circuits of this one type so that considerations with reference to conductor lines need be presented only for this one type of circuit to provide an understanding of the use of the present invention in a complete network.

The inputs 41 and 42 of this circuit lead to emitter followers of other circuits. The steady-state input resistances of this circuit are thus very high, e.g., >10kΩ. Its identical output resistors R, which emit identical amplitude output signals whose polarities are inverted with respect to each other, should have the lowest values possible in view of the speed of the circuit. However, the maximum permissible power loss should be considered and this will place a lower limit on the resistance value downwardly.

FIG. 4 shows the connection of a two-phase line 43 according to the invention to the circuit outputs $q$ and $\overline{q}$.

In a preferred embodiment of the two-phase line the characteristic impedances are much lower than the circuit input resistance so that at the end of the line there is essentially no load. This eliminates the flow of steady-state currents through the line from the circuit feeding the line, thus achieving a reduction in thermal loads on the transistors of the circuit and eliminating signal distortions caused by drops in the direct voltages along the line.

The output resistors R of the circuit perform a dual function. On the one hand, they form the generator resistances of the circuit outputs $q$ and $q$ which are in phase opposition. On the other hand, they terminate the two-phase line 43 connected thereto. Thus, a separate structural element for the termination of the line is eliminated. Furthermore, this arrangement always assures that the lines will be symmetrically terminated. This is true because while it is possible that the resistances of the output resistors R of integrated circuits are subjected to substantial deviations from their nominal values due to variations in the diffusion process employed for their manufacture, the resistance values relative to each other always remain the same.

When their resistance values are properly selected, the output resistors R can accept only one of the two waves flowing through the line. Calculations have shown that the wave type which carries the main portion of the useful signal must be terminated by the characteristic impedance $Z_{w1}=Z=\sqrt{L/C}$, with $Z_{w1}=R=Z$, where $L$=partial inductance, and $C$= partial capacitance of the line. The partial inductance is constituted by the inductance of an outer conductor relative to the center conductor, and the partial capacitance is the capacitance between an outer conductor and the center conductor.

Figure 5:
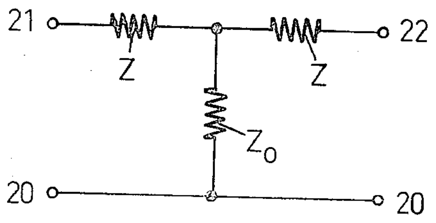
FIG. 5 is a simplified circuit diagram showing terminations for a conductor according to the invention.

This termination of the line utilizes the difference wave for the signal information transmission. The other wave type, whose characteristic impedance $Z_{w2}=Z+2Z_0$, appears as in-phase signal or as interference signal, respectively, and is mainly created by an asymmetrical load of the two-phase line due to circuit capacitances, e.g. of other connected circuits. The values of Z and $Z_0$ can be derived from a three-terminal equivalent circuit diagram containing impedances for the line input or output, respectively, of the two-phase line, such a circuit being shown in FIG. 5.

The impedance $Z_0$ is, as can be seen in the three-terminal equivalent diagram, a measure for the coupling between the outer conductors of the respective line. The reference numerals employed in FIG. 5 correspond to those of FIG. 2. It is particularly favorable, as will be shown later, to select $Z_0=Z/2$.

Since in the circuit systems here considered the two-phase lines have substantially no load at their outputs, it is not necessary, when one of the complementary signals to be transmitted is not required as an input value for the circuit connected to the output end of the line, to connect the conductor over which this signal is transmitted (e.g. 21 or 22 in FIG. 2) to the respective circuit input.

In one exemplary case the selected values can be $R=Z=Z_{w1}=100$ ohms. This characteristic impedance was achieved by the following dimensioning of the two-phase line, the dimensions being those shown in FIG. 3: thickness=0.017 mm., $a$=0.14 mm., $b$=0.15 mm. and $c$=0.12 mm. The minimum distance between two two-phase lines has here proven to be most favorable at $d$=0.36 mm. With these dimensions it resulted that $Z_0$=51 ohms. Because of the inherently small dimensions of integrated circuits, the connecting points $q$ and $\overline{q}$ of the circuit of FIG. 4 could be directly given the required spacing of outer conductors 31 and 32 (FIG. 3) so that line inhomogeneities could be eliminated even at the points of connection to the line.

In some cases it might be desirable to transmit the complementary output signals $q$ and $\overline{q}$ separately in different directions, at least for short distances. In this case it is advisable to connect the outer striplines (e.g. 31 and 32 in FIG. 3) in parallel for such a transmission and to use them as the reference potential (ground) conductor because of their external shielding effect, while the inner conductor becomes the signal carrier. In this way a known shielded single-phase line results. In this case, making $Z_0=Z/2$ results in the particular advantage that the characteristic impedance of this line will be only very slightly different from that of the same line operated as a two-phase line so that the former can still be well matched to the output resistance R of the circuit. For operation of the two-phase line with a characteristic impedance $Z_{w1}$ of 100 ohms in the form of a shielded single-phase line, a characteristic impedance of 114 ohms results for the latter mode of operation so that a mismatch with less than 7% reflection results.

The circuit arrangement according to the present invention has been described specifically with respect to a particular type of emitter-coupled logic circuit. The invention can, however, also be used successively for all other fast-acting circuits whose output and input signals have a common reference potential and whose signals appear simultaneously and must be transmitted simultaneously.

It will be understood that the above description of the present invention is susceptible to various modifications, changes, and adaptations.

I claim:

1. In a printed circuit arrangement for operation in the gigahertz frequency range, which arrangement includes circuit elements mounted on a circuit board and arranged to operate with respect to a common reference potential, and printed conductors connecting the elements together, the improvement wherein said conductors are constructed as triple striplines each composed of three lines disposed parallel to one another, the center line being connected at its input point to a source of the reference potential and the two outer lines being connected to carry information signals, said outer lines being connected at their outputs in opposition to said center line via terminal resistances having the same resistance value.

2. An arrangement as defined in claim 1 wherein the characteristic impedances of said lines are substantially lower than the input resistances of the circuits to which the outputs of said lines are connected so that the outputs of said lines have substantially no load, the characteristic impedances of said lines being sufficiently high to cause those waves carrying the maximum signal energy which are reflected at the output end of said lines to be absorbed by the terminal resistances of said lines.

3. An arrangement as defined in claim 2 further comprising at least one circuit having two outputs one of which presents a binary signal and the other of which presents the inverted version of such binary signal, wherein for the transmission of at least one of the signals to a further circuit, the two outer lines of one said conductor are connected to respective outputs of said circuit.

4. An arrangement as defined in claim 1 wherein each of said strip lines is constructed and dimensioned so that the three-terminal equivalent impedance ($Z_0$) representing the coupling between the outer lines and the center line is approximately equal to one fourth of the value of the dynamic resistance existing between the two outer lines.

References Cited

UNITED STATES PATENTS

| | | | |
|---|---|---|---|
| 2,926,317 | 2/1960 | Blitz | 333—84 |
| 3,179,904 | 4/1965 | Paulsen | 333—84 |
| 3,221,274 | 11/1965 | Vaz | 333—84 |

OTHER REFERENCES

IBM Technical Disclosure Bulletin "Non-Linear Controllable Transmission Lines," by Kinberg et al., vol. 2, No. 6, April 1960. Copy in 255, 333–84.

HERMAN KARL SAALBACH, Primary Examiner

S. CHATMON, Jr., Assistant Examiner

U.S. Cl. X.R.

174—36, 68.5